(12) United States Patent
Coulmeau et al.

(10) Patent No.: US 8,126,599 B2
(45) Date of Patent: Feb. 28, 2012

(54) METHOD OF CALCULATING APPROACH TRAJECTORY FOR AIRCRAFT

(75) Inventors: François Coulmeau, Seilh (FR); Guilhem Putz, Toulouse (FR)

(73) Assignee: Thales (FR)

( * ) Notice: Subject to any disclaimer, the term of this patent is extended or adjusted under 35 U.S.C. 154(b) by 988 days.

(21) Appl. No.: 12/103,122

(22) Filed: Apr. 15, 2008

(65) Prior Publication Data

US 2008/0262665 A1    Oct. 23, 2008

(30) Foreign Application Priority Data

Apr. 20, 2007    (FR) .................................... 07 02893

(51) Int. Cl.
*G01C 21/00* (2006.01)
(52) U.S. Cl. ........................................ 701/16; 340/961
(58) Field of Classification Search .................. 701/1, 3, 701/14, 16; 340/951, 945, 961; 342/33–36
See application file for complete search history.

(56) References Cited

U.S. PATENT DOCUMENTS

| | | | |
|---|---|---|---|
| 7,835,825 B2 * | 11/2010 | Coulmeau et al. ................ | 701/3 |
| 7,925,394 B2 * | 4/2011 | Deker et al. .................. | 701/18 |
| 2004/0078136 A1 | 4/2004 | Cornell et al. | |
| 2007/0129855 A1 | 6/2007 | Coulmeau | |
| 2007/0219678 A1 | 9/2007 | Coulmeau | |
| 2007/0219679 A1 | 9/2007 | Coulmeau | |
| 2008/0065312 A1 | 3/2008 | Coulmeau et al. | |
| 2009/0043434 A1 * | 2/2009 | Deker ............................. | 701/16 |

FOREIGN PATENT DOCUMENTS

| | | |
|---|---|---|
| FR | 2881221 A1 | 7/2006 |
| FR | 2881234 A1 | 7/2006 |

OTHER PUBLICATIONS

U.S. Appl. No. 11/856,019, filed Sep. 15, 2007, Francois Coulmeau et al. (Not Yet Published).
U.S. Appl. No. 11/870,338, filed Oct. 10, 2007, Guy Deker et al. (Not Yet Published).
U.S. Appl. No. 11/957,202, filed Dec. 14, 2007, Francois Coulmeau (Not Yet Published).
U.S. Appl. No. 11/963,724, filed Dec. 21, 2007, Francois Coulmeau et al. (Not Yet Published).
U.S. Appl. No. 12/041,731, filed Mar. 4, 2008, Jerome Sacle et al. (Not Yet Published).

* cited by examiner

*Primary Examiner* — Yonel Beaulieu
(74) *Attorney, Agent, or Firm* — Lowe Hauptman Ham & Berner, LLP

(57) ABSTRACT

The general field of the invention relates to a method of calculating a so-called continuous descent approach procedure for aircraft. The method comprises calculation steps making it possible to determine a minimum distance making it possible to attain the runway by using the highest possible descent angles allowed by the performance of the aircraft, a maximum distance making it possible to attain the runway by using the lowest possible descent angles allowed by the performance of the aircraft, a step of comparing the minimum and maximum distances with a reference distance, the continuous descent approach procedure being possible if this reference distance is less than the maximum distance and greater than the minimum distance. The method also envisages replacing certain indeterminate points of the flight plan by points arising from the minimum and maximum distance calculations.

6 Claims, 5 Drawing Sheets

METHOD OF CALCULATING APPROACH TRAJECTORY FOR AIRCRAFT

RELATED APPLICATIONS

The present application is based on, and claims priority from, French Application Number 07 02893, filed Apr. 20, 2007, the disclosure of which is hereby incorporated by reference herein in its entirety.

BACKGROUND OF THE INVENTION

1. Field of the Invention

The field of the invention relates to methods of calculating approach trajectories for aircraft. The object of the invention is to optimize an aircraft's approach trajectory to an airport so as to best limit the environmental nuisance above the airport zones. This nuisance is essentially noise and greenhouse gas emissions. Terminal procedures for takeoff or landing have been the subject since the 1990s of research to decrease this nuisance.

2. Description of the Prior Art

FIG. 1 represents various approach profiles for landing an aircraft A on a landing runway ARR. The non-optimized current procedures comprise alternate plateaus and descent segments as indicated in the white staircase curve of FIG. 1. This vertical trajectory is called "Current". The plateaus P allow the air traffic controller to monitor and separate the aeroplanes in relation to the relief and in relation to the other aeroplanes by altitude criteria. They allow the aeroplane to decrease its speed, and to change its aerodynamic configuration by extending the slats and flaps while guaranteeing passenger comfort.

The introduction of new less noisy plateau-free approach procedures leads to constructions of very optimized vertical profiles where the margin of manoeuvre for recapturing the vertical plane in the event of deviation is very small. Two optimized approach profiles are represented in FIG. 1. The two profiles are representative of plateau-free vertical procedures, better known by the terminology CDA, the acronym standing for Continuous Descent Approach.

The vertical slopes of these procedures are pegged since the speed and the thrust of the aircraft are pegged. In these procedures, the thrust is in general pegged at a low value, close to the engine "idle" speed, also called the "Idle Thrust", so as to decrease noise and audible nuisance. The speeds are likewise fixed, either at their optimal value calculated by the onboard flight management system, also called the FMS, or because of constraints that the controller may have fixed at certain points of the approach. Each aeroplane, having regard to its performance, therefore follows a slope resulting from the economic speed/reduced thrust pair. This descent is termed OPT CONF/FPA. It is represented by a curved strip in FIG. 1.

Moreover, in certain cases, for reasons of determinism in the positioning of the aeroplane, constraints on the vertical trajectory may be fixed by the controller. These waypoint constraints C are represented in FIG. 1 by two inverted triangles with common apex. The FMS then limits the optimization of the profile to the determination of the speeds corresponding to a minimum thrust. This descent is termed OPT CONF. It is represented by a straight strip in FIG. 1. For most craft, the resulting thrust is then greater than the reduced thrust so as to enable the prescribed trajectory to be followed.

The onboard flight management system termed FMS is the computer which determines the geometry of the vertical profile, and dispatches the guidance setpoints for following this profile to the pilot or to the automatic pilot. FIG. 2 represents an FMS having available the functions described in the AEEC standard, the acronym standing for Airlines Electronic Engineering Committee, bearing the reference ARINC 702A and entitled "Advanced Flight Management Computer System". This system comprises notably:

- the navigation functions dubbed "LOCNAV" 170, for performing optimal location of the aircraft as a function of the geo-locating means 60 which can be, for example, geo-satellite locating means of GPS or GALILEO type, VHF radio beacons, inertial platforms, etc.;
- the flight plan determination functions dubbed "FPLN" 110, making it possible to input the geographical elements constituting the skeleton of the route to be followed and which are the departure and arrival procedures, the waypoints also called "airways";
- the navigation database dubbed "NAVDB" 130, for constructing geographical routes and procedures using data included in the bases, these data being points, beacons, interception or altitude segments called "legs", etc.;
- the performance database, dubbed "PRF DB 150", containing the aerodynamic parameters and the performance of the engines of the craft;
- the functions for determining lateral trajectory dubbed "TRAJ", 120 making it possible to construct a continuous trajectory on the basis of the points of the flight plan, complying with the aeroplane performance and the confinement constraints called "RNP";
- the prediction functions dubbed "PRED" 140, making it possible to construct a vertical profile optimized on the lateral trajectory;
- the guidance functions dubbed "GUID" 200, for guiding the aircraft on its 3D trajectory in the lateral and vertical planes, while optimizing the speed. These functions are linked to the automatic pilot 80;
- the functions of digital data links "DATALINK" 180 for communicating with the control centres 70 and the other aircraft.

The FMS as a whole is linked to man-machine interfaces 50 such as screens, keyboards, designators, etc.

The FMS operates as follows. The flight plan is entered by the pilot or through a data link using data contained in the navigation database. It consists of a succession of segments called "legs" which are formed of a termination and of a geometry such as turn, great circle, rhumb line, etc. These legs are standardized at the international level in an AEEC document bearing the reference ARINC 424.

The pilot thereafter enters the aeroplane parameters such as its mass, the cruising levels, the optimization criteria allowing the modules TRAJ and PRED to calculate respectively the lateral trajectory and the vertical profile in terms of altitude and of speed of the aircraft. The vertical profile is built on the lateral trajectory and therefore changes with the latter.

The major problem which today prevents massive deployment of continuous descent approach procedures, stems from the way in which controllers must operate and the current process for constructing the lateral segments for approach procedures. Specifically, during these phases, it very frequently happens that the structure of the flight plan of the approach contains only legs fixing the trajectory of the aeroplane with respect to the ground in a deterministic manner. Thus there exist legs of semi-infinite "half line" type, which start from a point, along a course or a route and go off to infinity. They are used by the control to "place" the aeroplanes on a "rail" and thereafter string them out to make them follow the final approach segment with optimized spacings for runway occupancy. This is illustrated in FIG. 3 which represents a view in a horizontal plane of an approach flight plan comprising various legs, including a semi-infinite leg. In this figure and in the following, the ends of the legs are represented by crosses denoted WPTi and the landing runway by a white rectangle denoted ARR. In general, the FMS then constructs the vertical profile by making the assumption that the "semi infinite" leg terminates when the orthogonal projection of the following leg is reached. In the case of FIG. 3, the instruction is firstly to follow the flight plan (WPT1 . . . WPT5), then to continue on the course starting from WP5 dashed in FIG. 3. The controller contacts the aeroplane at the right moment to order it to turn around so as to attain the final approach at WPT6, through a DIRECT TO instruction, for example.

It also very frequently happens in the approach phase that the aeroplane is tracked and controlled by radar. One then speaks of "radar vectoring". Specifically, having regard to the high traffic density in the environs of aerodromes, and the necessity to string out the aeroplanes at a sustained rhythm on the final segment with a view to landing, the controller takes the aeroplanes off their optimized 3D trajectory so as to slow them down or accelerate them as illustrated in FIG. 4. The controller has three degrees of freedom. He can dispatch course, speed and altitude setpoints to the aeroplane. The course setpoints are the ones most used in the approach, in order to shorten or conversely to lengthen the flight plan. The speed and altitude setpoints are degrees of freedom that are more complex since, ultimately, to land at the right speed and at the required runway-altitude, ensuring a fixed temporal separation between the aeroplanes, it is necessary to bring the aeroplane to the entrance to the final segment with the right speed and the right altitude. In the case of "radar vectoring" represented in FIG. 4, the aeroplane is put on course by the air traffic controller. It leaves the flight plan. The course is represented dashed ahead of the aeroplane. At the right moment, the controller orders a DIRECT TO, possibly with an interception course on the point WPT6.

The "nominal" vertical profile is calculated starting from the lateral flight plan. If the latter includes lateral discontinuities, they are processed "conventionally", the predictions are made by assuming a great circle between the points upstream and downstream of the discontinuity. For the semi-infinite legs, we project orthogonally onto the following leg to determine a nominal lateral flight plan as illustrated in FIGS. 5 and 6 which represent a view from above and a lateral view of an approach flight plan. In these figures, the point Proj corresponds to the projection of the semi-infinite leg starting from the point WPT5 onto the point WPT6, the starting point of the following leg.

In a large majority of cases, the lateral trajectory therefore evolves in a quasi systematic manner for all the aeroplanes in the approach. Consequently, the vertical profile optimized to reduce nuisance cannot be held.

SUMMARY OF THE INVENTION

The aim of the device according to the invention is to give the crew the means to decide and negotiate with the controller by calculating for them and by presenting them with the minimum and maximum margins for which the vertical continuous descent approach manoeuvre remains possible so as to maintain an approach of CDA type.

More precisely, the subject of the invention is a method of calculating a so-called continuous descent approach procedure for aircraft, that is to say a procedure making it possible to minimize the environmental nuisance created by the aircraft, the said aircraft being at a given altitude and given distance from the landing runway, characterized in that the said method comprises at least:

a first step of determining a so-called standard approach procedure consisting of a succession of finite segments or of semi-infinite half-lines called "legs", the finite segments being linked together by waypoints denoted "WPT(i)", the semi-infinite half-lines being linked to the following "leg" by a point denoted "Proj(i)", the orthogonal projection onto the following leg, this procedure making it possible to determine a standard distance denoted Dist-reference;

a second step of determining a so-called minimum approach procedure making it possible to determine the minimum distance denoted Dist-ADC-min making it possible to attain the runway by using the maximum permitted descent angles;

a third step of determining a so-called maximum approach procedure making it possible to determine the maximum distance denoted Dist-ADC-max making it possible to attain the runway by using the minimum permitted descent angles;

a fourth step of comparing the distances Dist-ADC-min and Dist-ADC-max with the distance Dist-reference, the continuous descent approach procedure being possible if the distance Dist-reference is less than the maximum distance Dist-ADC-max and greater than the minimum distance Dist-ADC-min.

The expression maximum or minimum permitted descent angle is understood to mean a descent angle:

allowed by the optimized management of the extending of the aerodynamic configurations such as the slats, flaps and undercarriages and by the maximum performance of the aircraft and, possibly limited by the constructor, the company or the crew for, for example, flight safety reasons.

Advantageously, when the continuous descent procedure is possible, then each point "Proj(i)" is replaced by two points denoted Proj(i)_early and Proj(i)_late determined in the following manner:

each point Proj(i)_early is obtained by displacing Proj(i) on the leg which supports it until, either the distance of the flight plan becomes equal to Dist-ADC-min, or Proj (i) attains the point which precedes it, the reference distance being recalculated by positioning the point on Proj(i)_early.

The point Proj(1)_late is obtained by displacing Proj(1) on the leg which supports it until the distance of the flight plan becomes equal to Dist-ADC-max; for i different from 1, each point Proj(i)_late is placed on the point Proj(i).

The invention also relates to a flight management system comprising means for implementing the previous calculation method, the said system then comprising means for transmitting the information arising from the said method to an air traffic control.

Finally, the invention relates to a man-machine interface configured to provide the pilot with a graphical representation of a flight plan, comprising the Proj(i)_early and Proj(i)_late information such as defined previously.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The invention will be better understood and other advantages will be apparent on reading the nonlimiting description which follows and by virtue of the appended figures among which.

MORE DETAILED DESCRIPTION

Figure 1:
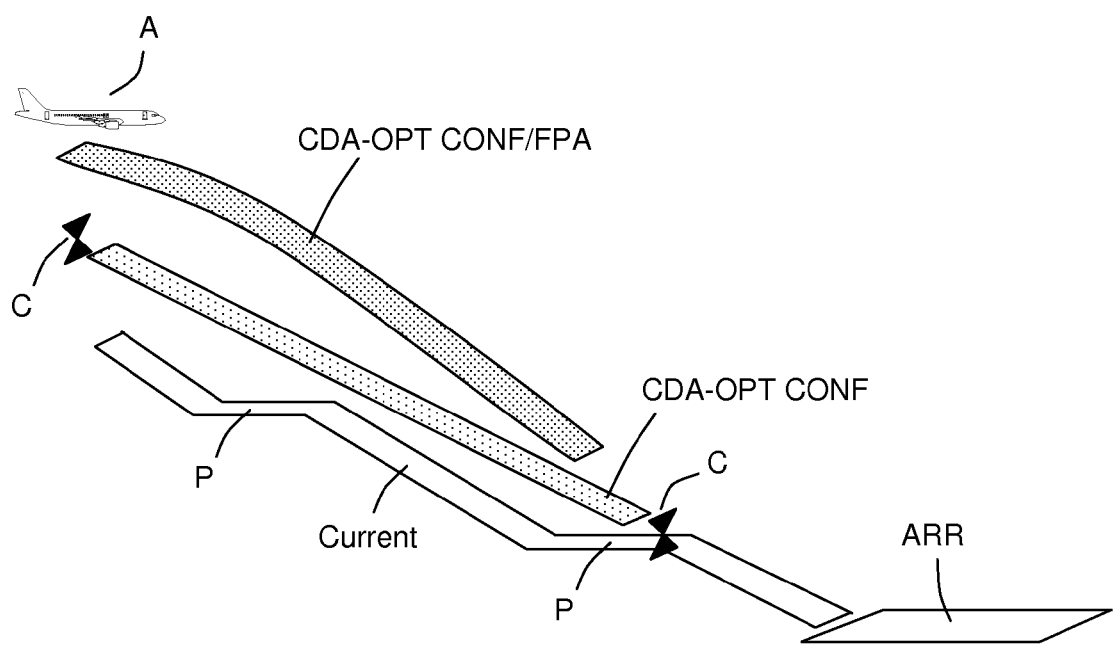
FIG. 1 represents the various landing approach profiles of an aircraft according to the prior art.
Figure 2:
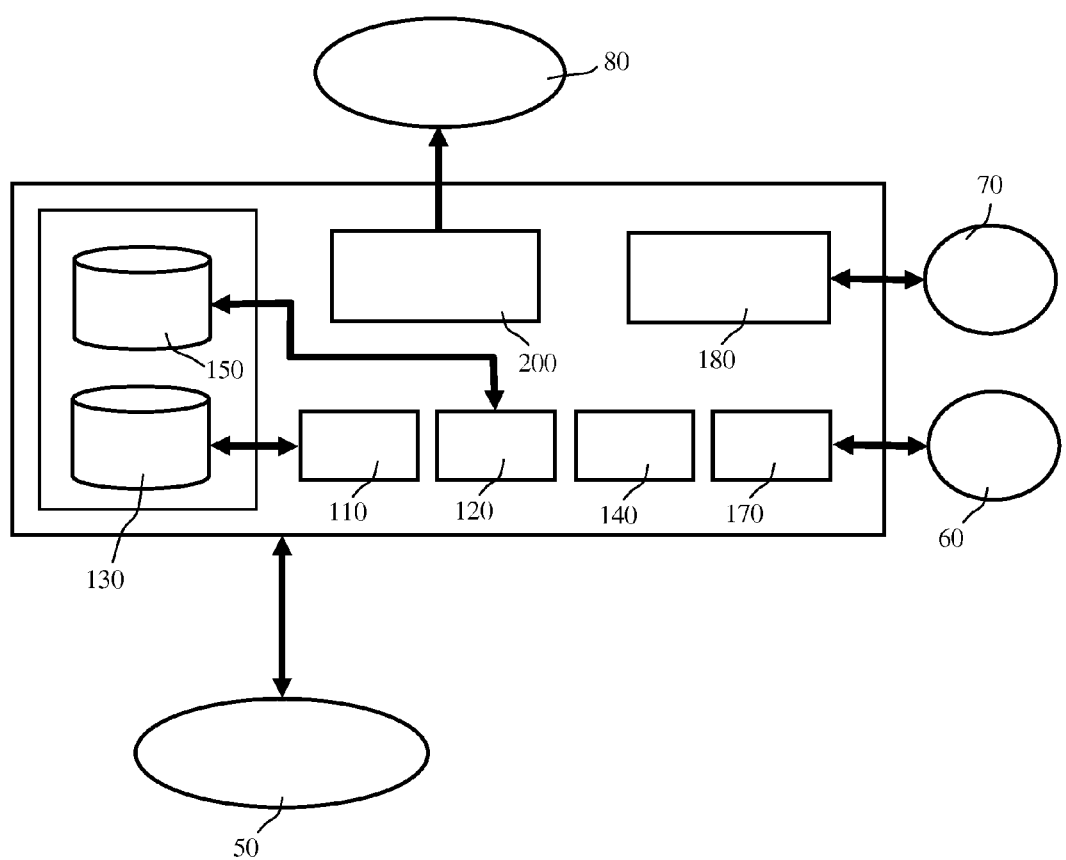
FIG. 2 represents the various functions carried out by an aircraft flight management system according to the prior art.
Figure 3:
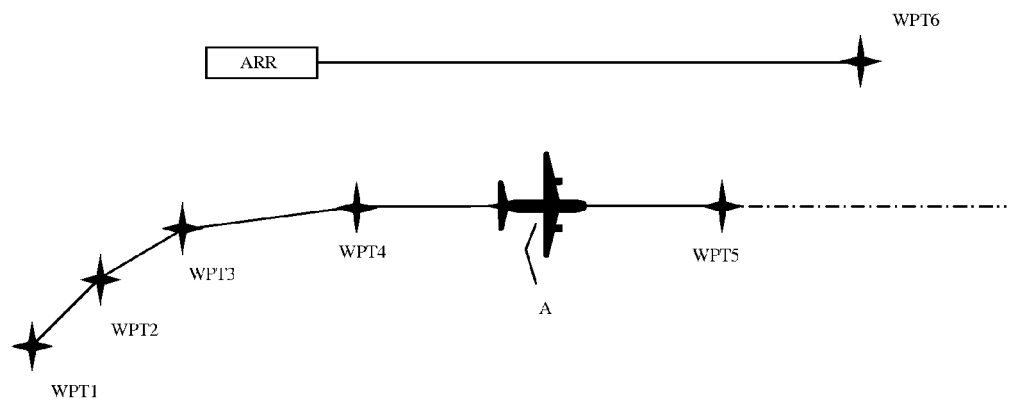
FIGS. 3 and 4 represent a view from above of the approach flight plans according to the prior art.
Figure 4:
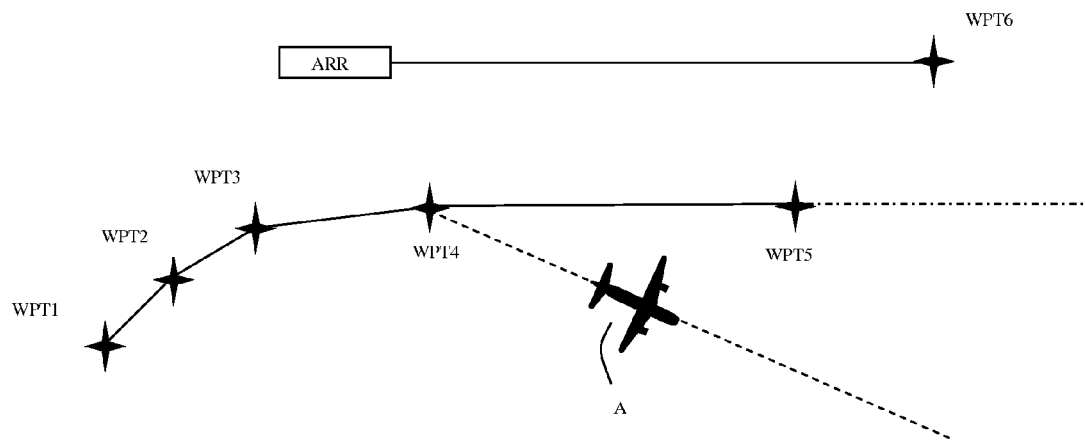
Figure 5:
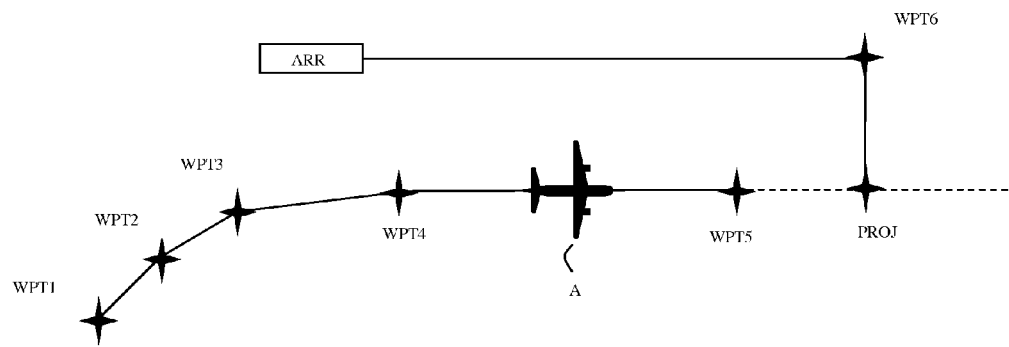
FIGS. 5 and 6 represent a view from above and a lateral view of an approach flight plan according to the prior art.
Figure 6:
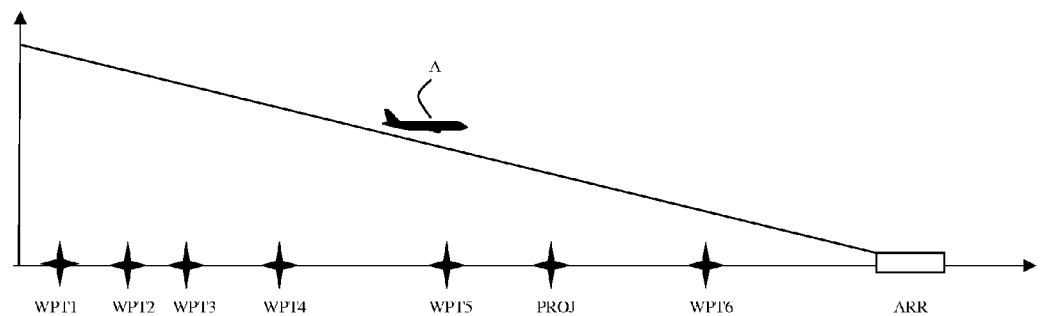

Each of the points defined arbitrarily by the FMS on semi-infinite legs is dubbed Proj(i). The flight management system according to the invention replaces the visualization of this point by that of the two ends of a segment [Proj(i)_early, Proj(i)_late] such that the points Proj(i)_early and Proj(i)_late correspond respectively to the minimum and maximum distances that the aircraft can travel while preserving its continuous descent approach procedure, so that, if the flight plan unfurls by choosing a point Proj(i) inside this segment, then the continuous descent approach remains possible.

The steps of the method according to the invention are described below. In a first step, the FMS calculates conventionally the distance corresponding to the lateral flight plan passing through the "conventional" points Proj(i) as was detailed above. This distance is dubbed Dist_reference.

In a second step, the FMS constructs backwards, starting from the runway, a continuous descent approach procedure by using the steepest possible descent angles, with diminished thrust better known by the term "IDLE". It may possibly use the slopes in a smooth configuration, flaps and slats extended, but also use the aero-brakes of the speed-brakes or airbrakes type, as well as the extending of undercarriages. It stops when the procedure has reached the altitude corresponding to the aeroplane's current one. This gives a minimum distance to the runway permitting a continuous descent approach that is called Dist-ADC-min.

In a similar manner, in a third step, the FMS constructs backwards a continuous descent approach procedure by using the flattest possible descent angles while complying with the prescribed minimum angles for the aeroplane during descent, with a reduced "IDLE" thrust. It stops when the procedure has reached the altitude corresponding to the aeroplane's current one. This gives a maximum distance to the runway permitting a continuous descent approach called Dist-ADC-max.

In a fourth step, the FMS establishes a comparison of the distances Dist-ADC-min and Dist-ADC-max with the distance Dist-reference, the continuous descent approach procedure being possible if the distance Dist-reference is less than the maximum distance Dist-ADC-max and greater than the minimum distance Dist-ADC-min.

In the case where the approach descent procedure is possible, then each point "Proj(i)" is replaced by two points denoted Proj(i)_early and Proj(i)_late determined in the following manner:

each point Proj(i)_early is obtained by displacing Proj(i) on the leg which supports it until, either the distance of the flight plan becomes equal to Dist-ADC-min, or the point Proj(i) attains the point which precedes it, the reference distance being recalculated by positioning the point on Proj(i)_early.

The point Proj(1)_late is obtained by displacing Proj(1) on the leg which supports it until the distance of the flight plan becomes equal to Dist-ADC-max; for i different from 1, each point Proj(i)_late is placed on the point Proj(i).

Figure 7:
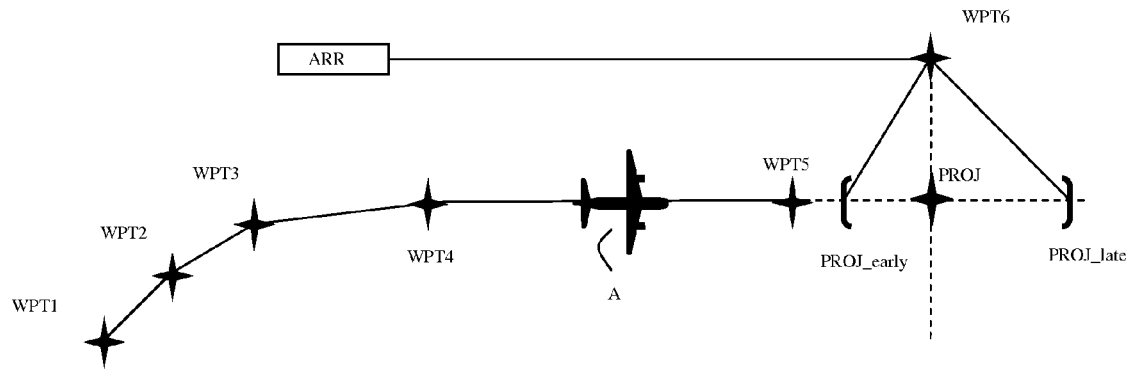
FIGS. 7 and 8 represent two flight plans according to the invention, the first comprises the positioning of a point, the second comprises the positioning of two points.
Figure 8:
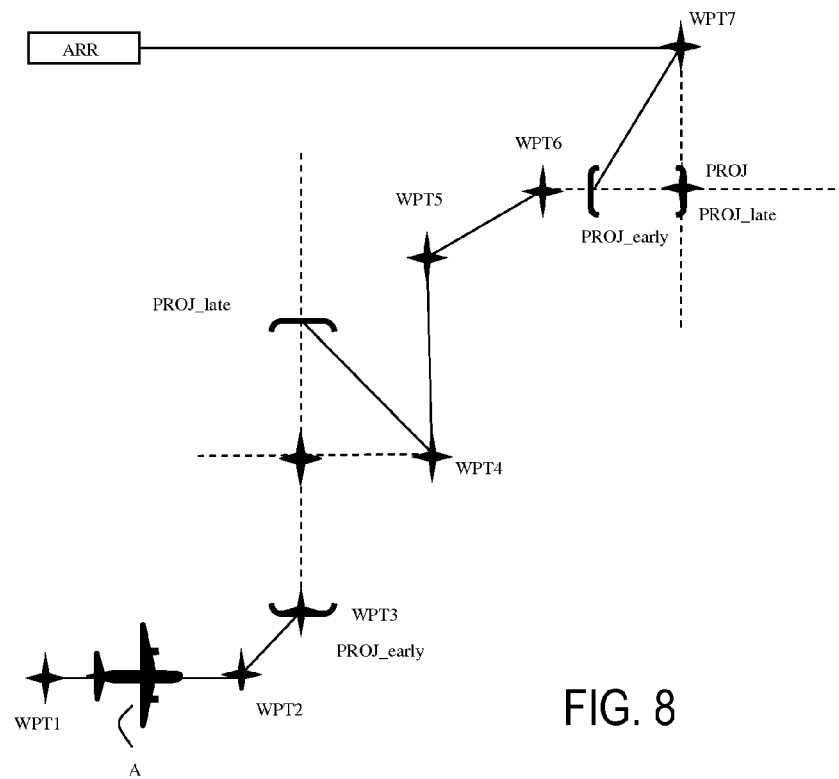

By way of examples, FIGS. 7 and 8 illustrate two configurations of approach procedures represented in a horizontal plane where the method according to the invention is implemented. In these figures, the points Proj(i) are represented by brackets.

In FIG. 7, the initial flight plan comprised only one point Proj(1), the projection of the point WPT6 onto the semi-infinite leg starting from the point WPT5. In this case, the method replaces the point Proj(1) by the two points denoted Proj(1)_early and Proj(1)_late following the conventions indicated above.

In FIG. 8, the initial flight plan comprised two points Proj(1), the projections of the points WPT4 and WPT7 onto the semi-infinite legs starting respectively from the points WPT3 and WPT6.

In this case, the method replaces the point Proj(1) by the two points denoted Proj(1)_early and Proj(1)_late following the conventions indicated above. Proj(1)_early thus coincides in this figure with WPT3.

The method replaces the point Proj(6) by the two points denoted Proj(6)_early and Proj(6)_late following the conventions indicated above. Proj(6)_late thus coincides in this figure with the initial point Proj(6).

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

What is claimed is:

1. A method of calculating a continuous descent approach procedure for an aircraft, to minimize the environmental nuisance as noise and greenhouse gas emission created by the aircraft, a continuous descent approach being plateau-free, thrust of an engine of the aircraft being pegged at a low value, close to the engine "Idle Thurst,"the aircraft being at a given altitude and given distance from a landing runway, said method being implemented by a device of a flight management system and comprising the steps of:

a first step of determining a standard approach procedure including a succession of finite segments and/or of semi-infinite half-lines, the finite segments being linked together by waypoints denoted "WPT(i)", the semi-infinite half-lines being linked to the following semi-infinite half-lines by a point denoted "Proj(i)", the projection onto the following leg, this procedure making it possible to determine a standard distance denoted Dist-reference;

a second step of determining a minimum approach procedure to determine the minimum distance denoted Dist-ADC-min to attain the runway by using the maximum permitted descent angles;

a third step of determining a maximum approach procedure to determine the maximum distance denoted Dist-ADC-max to attain the runway by using the minimum permitted descent angles; and a fourth step of comparing the distances Dist-ADC-min and Dist-ADC-max with the distance Dist-reference, the continuous descent approach procedure being possible if the distance Dist-reference is less than the maximum distance Dist-ADC-max and greater than the minimum distance Dist-ADC-min.

2. The method of calculating an approach procedure according to claim 1, wherein, when the continuous descent procedure is possible, then each point "Proj(i)" is replaced by two points denoted Proj(i)_early and Proj(i)_late determined in the following manner:

each point Proj(i)_early is obtained by displacing Proj(i) on the leg which supports it until, either the distance of the flight plan becomes equal to Dist-ADC-min, or Proj (i) attains the point which precedes it, the reference distance being recalculated by positioning the point on Proj(i)_early;

the point Proj(1)_late is obtained by displacing Proj(1) on the leg which supports it until the distance of the flight plan becomes equal to Dist-ADC-max; for i different from 1, each point Proj(i)_late is placed on the point Proj(i).

3. A flight management system comprising a device configured to implement a calculation method, wherein said method comprising the steps of:

a first step of determining a standard approach procedure including a succession of finite segments and/or of semi-infinate half-lines, the finite segments being linked together by waypoints denoted "WPT(i)", the semi-infinite half lines being linked to the following semi-infinite half-lines by a point denoted "Proj(i)", the projection onto the following leg, this procedure making it possible to determine a standard distance denoted Dist-reference;

a second step of determining a minimum approach procedure to determine the minimum distance denoted Dist-ADC-min to attain the runway by using the maximum permitted descent angles;

a third step of determining a maximum approach procedure to determine the maximum distance denoted Dist-ADC-max to attain the runway by using the minimum permitted descent angles; and a fourth step of comparing the distances Dist-ADC-min and Dist-ADC-max with the distance Dist-reference, the continuous descent approach procedure being possible if the distance Dist-reference is less than the maximum distance Dist-ADC-max and greater than the minimum distance Dist-ADC-min.

4. Man-machine interface configured to provide the pilot with a graphical representation of a flight plan, comprising a display device configured to display on said representation the Proj(i)_early and Proj(i)_late information according to claim 2.

5. The method of calculating an approach procedure according to claim 1, wherein, when the continuous descent procedure is possible, then each point "Proj(i)" is replaced by two points denoted Proj(i)_early and Proj(i)_late determined in the following manner:

each point Proj(i)_early is obtained by displacing Proj(i) on the leg which supports it until, either the distance of the flight plan becomes equal to Dist-ADC-min, or Proj (i) attains the point which precedes it, the reference distance being recalculated by positioning the point on Proj(i)_early;

the point Proj(1)_late is obtained by displacing Proj(1) on the leg which supports it until the distance of the flight plan becomes equal to Dist-ADC-max; for i different from 1, each point Proj(i)_late is placed on the point Proj(i).

6. The flight management system according to claim 3, further comprising a transmitting device which is configured to transmit the information arising from the method to an air traffic control.

* * * * *